Feb. 10, 1925.
E. L. SKINNER
FISHING TOOL
Filed May 13, 1924
1,525,896
2 Sheets-Sheet 1
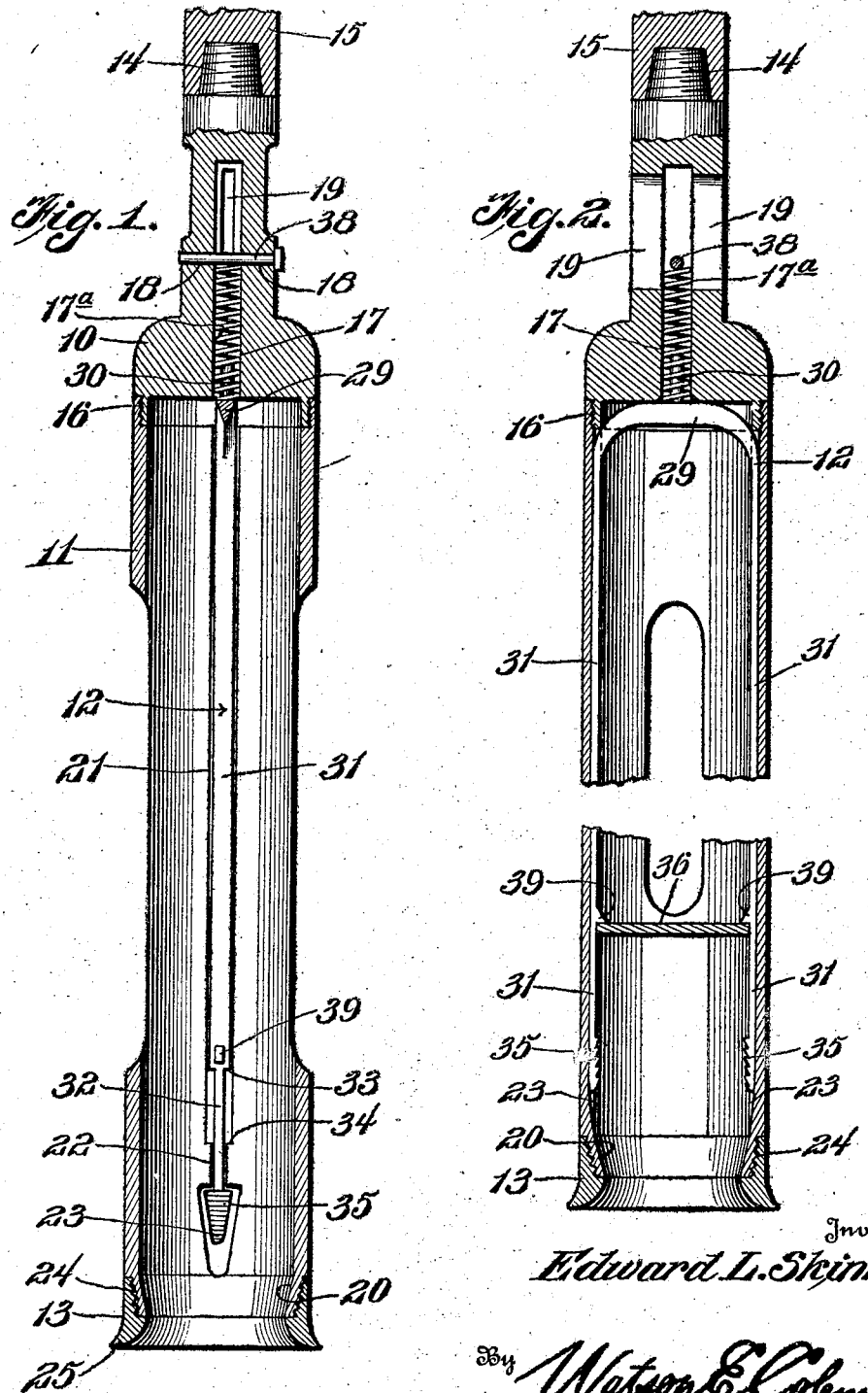
Inventor
Edward L. Skinner
By Watson E. Coleman
Attorney

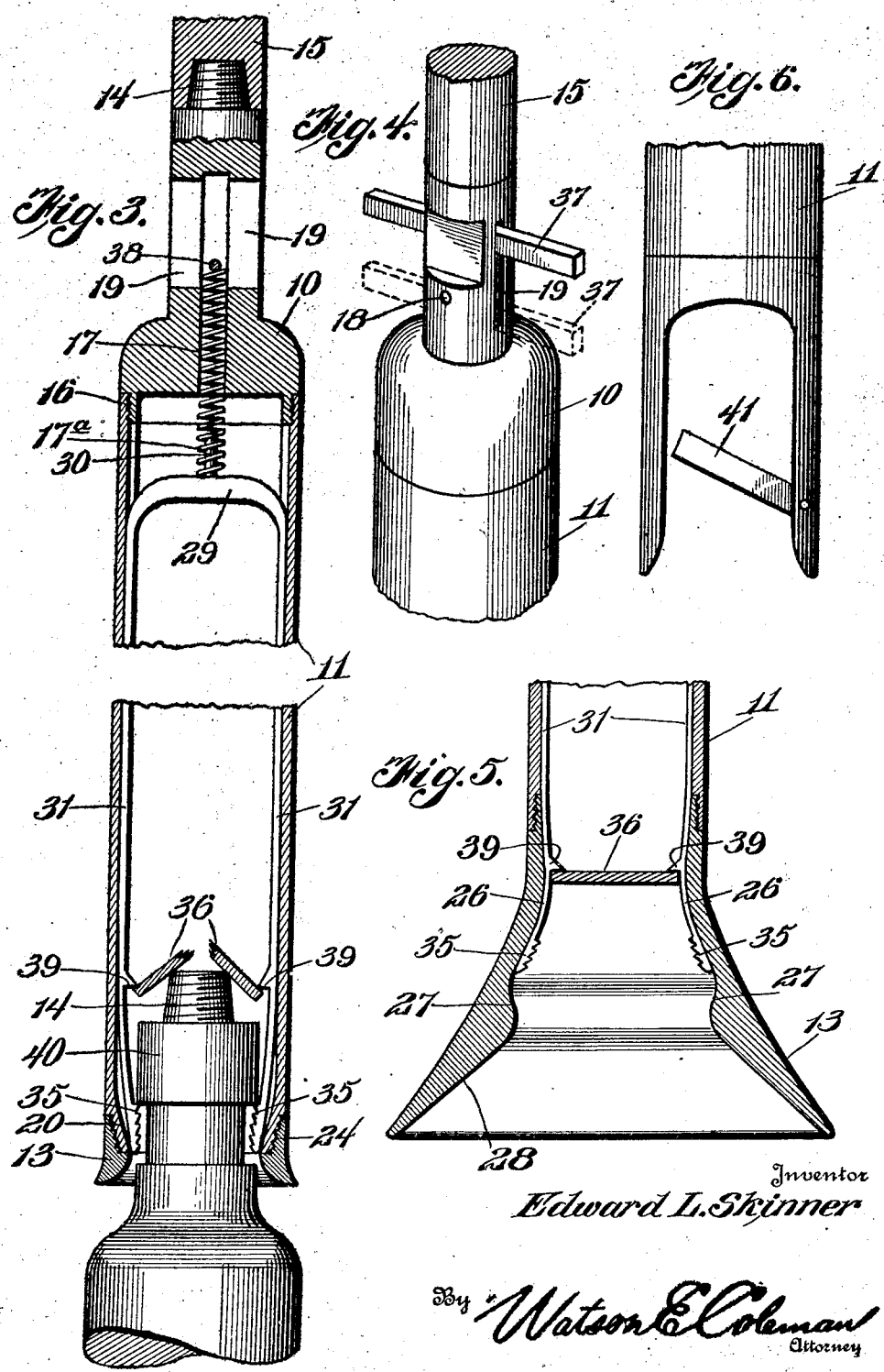

Patented Feb. 10, 1925.

1,525,896

UNITED STATES PATENT OFFICE.

EDWARD L. SKINNER, OF LEWISTOWN, MONTANA, ASSIGNOR OF ONE-HALF TO CHARLES O. WOODWORTH, OF LEWISTOWN, MONTANA.

FISHING TOOL.

Application filed May 13, 1924. Serial No. 713,047.

*To all whom it may concern:*

Be it known that I, EDWARD L. SKINNER, a citizen of the United States, residing at Lewistown, in the county of Fergus and State of Montana, have invented certain new and useful Improvements in Fishing Tools, of which the following is a specification, reference being had to the accompanying drawings.

This invention relates to fishing tools for use in recovering tools lost in deep well drilling operations and more particularly to a slip socket construction.

An important object of the invention is to provide a device of this character insuring the proper positioning of the tool sought before the slips of the socket are rendered operative to engage the tool, so that all likelihood of the tool engaging and destroying the slips as the socket is lowered into the well is eliminated.

A further object of the invention is to provide a device of this character which is capable of a considerable range of alteration as regards its adaptability for engagement with tools of various sizes.

A still further object of the invention is to provide a device of this character which may be readily and rapidly prepared for use, which is simple in its construction and operation and which will be durable and efficient in service.

These and other objects I attain by the construction shown in the accompanying drawings, wherein for the purpose of illustration is shown a preferred embodiment of my invention and wherein:—

Figure 1 is a vertical sectional view taken through a fishing tool constructed in accordance with my invention;

Figure 2 is a similar view taken at right angles to that shown in Figure 1;

Figure 3 is a view similar to that shown in Figure 2, the fishing tool being shown engaged with an implement;

Figure 4 is a perspective view of the upper end of the fishing tool, showing the manner of compressing the spring 17$^a$;

Figure 5 is a vertical sectional view through the lower end of a slightly modified type of fishing tool for use with tools which are larger than the barrel 11;

Figure 6 is a fragmentary side elevation showing the use of other types of fishing tools attached to the lower end of the barrel 11.

Referring now more particularly to the drawings, the tool comprises a head 10, a barrel 11 removably engaged with the head, a slip unit 12 arranged within the barrel, and a plurality of bell flanges 13 interchangeably engageable with the lower end of the barrel to adapt the barrel for use in casings or tubing of different sizes. As will hereinafter more fully appear, the slip units 12 are of slightly modified construction and may be substituted for one another within the barrel for engagement with tools of varying sizes.

The head 10 is adapted at its upper end, as at 14, for engagement with the tool shank 15 of a drilling line, (not shown). The lower end of the head is reduced in external diameter and externally screw-threaded, as at 16, for the reception of the interiorly threaded upper end of the barrel. This head has an axial bore 17 extending upwardly from the bottom thereof and is provided with a transverse opening 18 in the shank portion intersecting the bore 17 and with a transverse slot 19 likewise formed in the shank and at right angles to the bore 18, the slot being vertically elongated for a purpose presently to appear.

The barrel 11 has a uniform bore from its upper end to a point adjacent its lower end and at this lower end the bore tapers inwardly toward the lower end as at 20. In its side walls at diametrically opposed points the barrel is provided with vertical channels 21 having at their lower ends a restricted portion 22 which by its combination with the channels 21 forms upwardly directed shoulders at the upper end of the restricted portion 22 and this restricted portion at its lower end communicates with a further enlargement of the groove forming a slip receiving cove 23. The exterior of the lower end of the barrel is screw-threaded, as at 24, for engagement with interior screw-threads formed on the bells 13.

The bells 13 include two different types. The first of these types, and of which Figure 1 will serve as an example, is employed for fishing for tools the shank portions of which, or that portion which is to be engaged by the slips, is small enough to engage in the barrel, simply having an outwardly and downwardly tapering lower end indicated at 25. The second type is employed where the diameter of the tool to be engaged is such that it cannot enter the barrel. The interior surface of the upper end of the barrel has a downwardly and outwardly inclining portion 26 merging with a downwardly and inwardly inclining portion 27. Below this downwardly and inwardly inclining portion 27 the interior of the bell again flares outwardly as at 28.

The slip units 12 each comprise an upper cross bar 29 having extending upwardly therefrom a lug 30, this lug being centrally located with respect to the bar and being adapted to receive the lower end of a spring 17$^a$ located within the vertical bore 17 of the head 10. Extending downwardly from opposite ends of the bar are slip shanks 31 each comprising a long relatively straight portion of a width equal to the width of the slot 21, these shanks having reduced extensions 32. The shanks 31 are of slightly less length than the slots or channels 21 so that they are capable of a limited vertical movement in these channels, the downwardly facing shoulders 33 formed at the junction of the shanks 31 and reduced extensions 32 engaging the upwardly directed shoulders 34 formed at the junction of the channels 21 and reduced channel 22 to limit downward movement of the slip shanks in the grooves. In the type of slip unit employed where the tool to be engaged is small enough to enter the barrel, the extensions 22 of the shanks 31 are of such length that the slips 35 lie within the slip grooves 23 formed in the walls of the barrel when the cross bar 29 is engaged against the under surface of the head. In the form used where the tool is too large to enter the barrel, these extensions are made of such length that the slips 35 lie at the point where the oppositely inclining faces 26 and 27 merge upon the bell.

In the use of the device, the size of the tool to be engaged having been determined and the size of the casing in which the fishing operation is to take place, the proper bell and slip are placed in position. The slip unit is moved upwardly until the cross bar 29 engages against the under surface of the head and a flexible element, such as a stick of wood or a light bar of cast iron, is placed between the two shank portions of the slips 35, as indicated at 36, to force these shank portions tightly into engagement with the bases of the grooves so that they frictionally engage the walls of the casing. A bar 37 is then inserted through the slot 19 of the head above the upper end of the spring and the spring forced downwardly until a retaining element 38 can be inserted in the bore 18 to maintain it in its compressed position. This spring constantly urges the slips downwardly but due to the fact that the slips frictionally engage the walls of the casing they cannot shift the same. As the tool is lowered into the well the bell guides the tool into position between the slips 35 and after the tool is positioned between these slips it comes into contact with the bar 36. This bar is held against upward movement upon the slip shanks by downwardly facing shoulders 39 formed upon these shanks and accordingly when pressure is brought to bear upon the bar it is broken, permitting the slips to move downwardly under the influence of the spring and likewise permitting them to move inwardly away from the walls of the barrel. These slips during their downward movement are caused to move toward one another either by engagement with the inward taper of the lower end of the barrel or by the inwardly and downwardly tapering portion of the bell with which they are associated, this depending, of course, upon the type of slip being employed. By this inward movement they are brought beneath the enlargement of the head 40 of the tool and as the barrel is elevated will firmly grip the tool so that the tool is elevated with the barrel. The cross bar 29 preferably tapers downwardly, being sharpened upon its lower edge, as indicated, so that in event the tool is embedded in dirt or the like this material will not interfere with the downward movement. It will be obvious that the head employed may be employed with different types of tools as, for example, a bail latch such as shown at 41 in Figure 6. The construction illustrated being capable of a considerable range of change and modification without materially departing from the spirit of my invention, I do not limit myself to such specific structure as hereinbefore set forth except as hereinafter claimed.

I claim:—

1. In a fishing tool, a barrel, a pair of grooves formed in opposite walls of the barrel, the lower ends of said grooves having reduced extensions, a bar extending transversely of the barrel at the upper end thereof, a slip shank extending downwardly from each end of the bar and operating in a groove of the wall, said slip shanks having reduced slip bearing extensions operating within the reduced extensions of the grooves, the slip shanks by their engagement with the lower end walls of the grooves being limited in their downward movement, and means displaced by intrusion of a tool between the slip shanks for forcing the shanks into frictional engagement with the walls of the barrel to support the same above the lower limit of their movement.

2. In a fishing tool, a barrel, a pair of grooves formed in opposite walls of the barrel, the lower ends of said grooves having reduced extensions, a bar extending transversely of the barrel at the upper end thereof, a slip shank extending downwardly from each end of the bar and operating in a groove of the wall, said slip shanks having reduced slip bearing extensions operating within the reduced extensions of the grooves, the slip shanks by their engagement with the lower end walls of the grooves being limited in their downward movement, means displaced by intrusion of a tool between the slip shanks for forcing the shanks into frictional engagement with the walls of the barrel to support the same above the lower limit of their movement, comprising a frangible bar extending between the slip shanks, and shoulders on the slip shanks limiting upward movement of the frangible bar to prevent accidental displacement thereof.

3. In a fishing tool, a barrel, a pair of grooves formed in opposite walls of the barrel, the lower ends of said grooves having reduced extensions, a bar extending transversely of the barrel at the upper end thereof, a slip shank extending downwardly from each end of the bar and operating in a groove of the wall, said slip shanks having reduced slip bearing extensions operating within the reduced extensions of the grooves, the slip shanks by their engagement with the lower end walls of the grooves being limited in their downward movement, means displaced by intrusion of a tool between the slip shanks for forcing the shanks into frictional engagement with the walls of the barrel to support the same above the lower limit of their movement, and means for forcing said slip shanks downwardly when released, the lower end of the bore of said barrel having an inward taper against which the slips engage to be guided inwardly for engagement with the tool.

4. In a fishing tool, a barrel, a pair of grooves formed in opposite walls of the barrel, the lower ends of said grooves having reduced extensions, a bar extending transversely of the barrel at the upper end thereof, a slip shank extending downwardly from each end of the bar and operating in a groove of the wall, said slip shanks having reduced slip bearing extensions operating within the reduced extensions of the grooves, the slip shanks by their engagement with the lower end walls of the grooves being limited in their downward movement, means displaced by intrusion of a tool between the slip shanks for forcing the shanks into frictional engagement with the walls of the barrel to support the same above the lower limit of their movement, a head for said barrel having a bore, a spring disposed within said bore and engaging said bar, and removable means extending transversely of the bore for maintaining said spring in compressed position until the slip shanks are released for movement.

5. In a fishing tool, a barrel, a pair of grooves formed in opposite walls of the barrel, the lower ends of said grooves having reduced extensions, a bar extending transversely of the barrel at the upper end thereof, a slip shank extending downwardly from each end of the bar and operating in a groove of the wall, said slip shanks having reduced slip bearing extensions operating within the reduced extensions of the grooves, the slip shanks by their engagement with the lower end walls of the grooves being limited in their downward movement, means displaced by intrusion of a tool between the slip shanks for forcing the shanks into frictional engagement with the walls of the barrel to support the same above the lower limit of their movement, a head for said barrel having a bore, a spring disposed within said bore and engaging said bar, and removable means extending transversely of the bore for maintaining said spring in compressed position until the slip shanks are released for movement, said shank having formed therethrough a diametrically extending longitudinally elongated slot intersecting said bore whereby to permit insertion of a tool for compressing said spring.

In testimony whereof I hereunto affix my signature.

EDWARD L. SKINNER.